United States Patent [19]

Shibagaki et al.

[11] Patent Number: 4,704,715

[45] Date of Patent: Nov. 3, 1987

[54] INFORMATION COMMUNICATION SYSTEM

[75] Inventors: Taro Shibagaki, Tokyo; Hiroyuki Ibe, Yokohama; Toshifumi Tamura, Tokyo; Takeshi Ozeki, Tokyo; Yoichi Hirayama, Tokyo, all of Japan

[73] Assignee: Kabushiki Kaisha Toshiba, Kawasaki, Japan

[21] Appl. No.: 748,449

[22] Filed: Jun. 25, 1985

[30] Foreign Application Priority Data

Jun. 25, 1984 [JP] Japan ............................... 59-129198
Jun. 25, 1984 [JP] Japan ............................... 59-129200

[51] Int. Cl.⁴ ............................................... H04J 1/02
[52] U.S. Cl. .......................................... 370/50; 370/3; 370/122; 370/69.1; 455/615
[58] Field of Search ................ 370/50, 69.1, 122, 124, 370/11, 1-3, 71; 455/16, 17, 42, 45, 615; 358/142, 143, 144

[56] References Cited

U.S. PATENT DOCUMENTS

| | | | |
|---|---|---|---|
| 3,655,917 | 4/1972 | Levine | 370/50 |
| 3,894,177 | 7/1975 | Howell et al. | 358/143 |
| 4,075,429 | 2/1978 | Takahata et al. | 370/50 |
| 4,382,266 | 5/1983 | Panzer | 455/615 |
| 4,545,048 | 10/1985 | Hauk et al. | 370/71 |

OTHER PUBLICATIONS

ECOC 83–9th European Conference on Optical Communication, pp. 335–338, Fiber Optic Subscriber Systems for a Trial Broadband Switching Network; Yoichi Nagata and Tokuhiro Kitami; 1983.

IEEE Trans. Broadcasting, vol. BC-28, No. 4, pp. 172–175, Transmission System for the Television Broadcasting Satellite; Takehiro Izumi, Aogu Matsumae; Dec. 1982.

Primary Examiner—Douglas W. Olms
Assistant Examiner—Wellington Chin
Attorney, Agent, or Firm—Spivak, McClelland, & Maier Oblon, Fisher

[57] ABSTRACT

In this information transmission system, a PCM encoder is provided for time-division multiplexing multichannel audio signals and a digital character information signal to generate a time-division multiplexed, or TDM, information signal. The TDM information signal is angle-modulated by the modulator to generate an angle-modulated information signal. This signal is supplied to a frequency-division multiplexer, which multiplexes the angle-modulated information signal and an image signal so as to generate a frequency-division multiplexed, or FDM, information signal which is adapted to be supplied to a certain subscriber.

11 Claims, 7 Drawing Figures

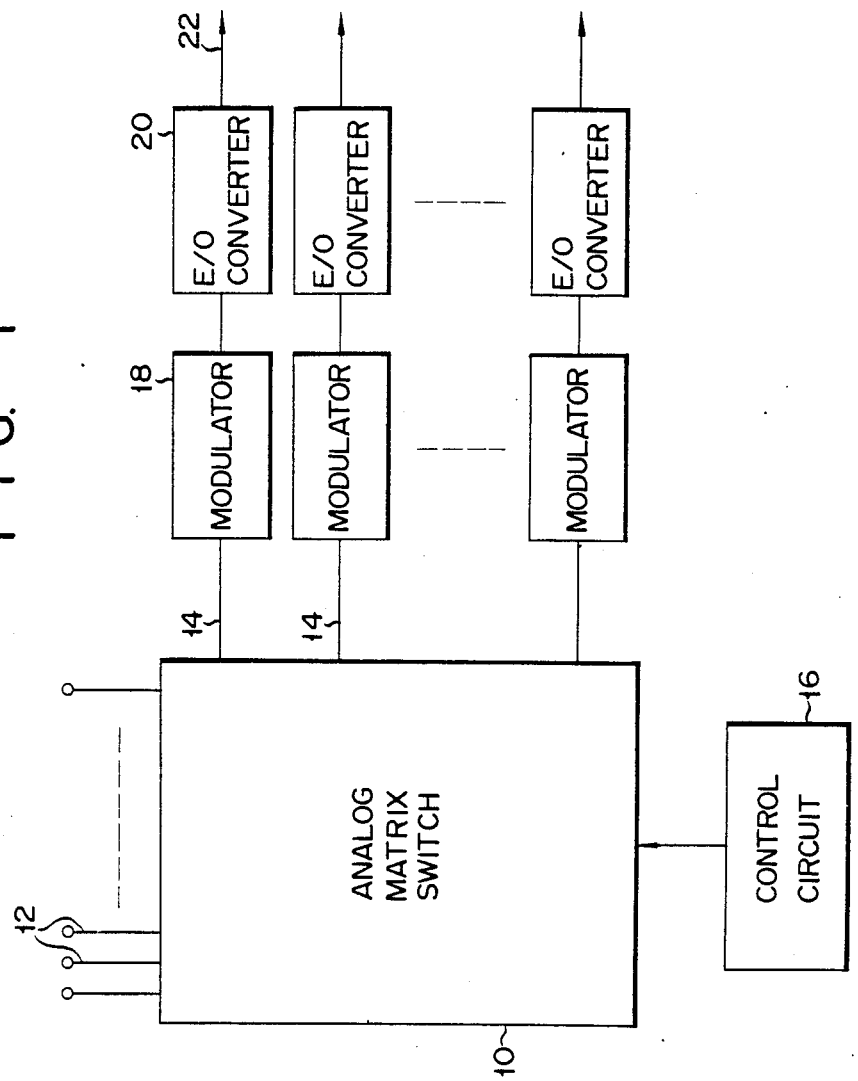
F I G. 1

INFORMATION COMMUNICATION SYSTEM

BACKGROUND OF THE INVENTION

The present invention relates generally to an information communication system and, particularly, to an information communication system including a signal selecting apparatus for effectively servicing subscribers with desired pieces of information, such as image signals and multichannel audio signals, in response to the request of the subscribers.

Recently, attention is being paid to new communication systems for supplying various desired information to the homes of subscribers. For example, a terminal unit provided in the home is operated by the user to specify a desired combination of image and audio signals such as stereo sound. Various systems have been considered to realize this kind of system. One example of such a system has selector units for selecting the information signals to be sent to the subscriber located in a relay station known as a sub center. Such systems using sub centers are desirable, since unauthorized reception can be readily prevented, maintenance is easy and the leving of fees simple.

Information signals supplied from the sub center to the subscriber include various different kinds such as (1) signals supplied from the center to the sub center, (2) signals transmitted from a geostationary satellite to the sub center, and (3) signals supplied independently by the sub center, for example, package system media such as video discs. The largest proportion of the signals supplied to the subscriber are from a center to the sub center. With a system in which image signals, multichannel sound signals (stereo signals included with the image signals, or separate audio signals) and digital signals, such as character data, are sent from the center to the sub center, optical fibers are most suitable. In order to improve the transmission efficiency of the different signals over the optical fiber, a frequency-division multiplexing scheme is used.

Suitable signals in the frequency-division multiplexing scheme are selected via an analog matrix switch in response to the demands of the subscribers. With optical fiber transmission, image signals are sent in a baseband of several megahertz or less, while sound and data signals are sent spread over a higher frequency band. However, with this kind of simple frequency-division multiplexing system, at least four kinds of signals in the entire communication frequency band (one image signal, two sound signals and one data signal) are multiplexed, so there is a problem of image degradation due to different frequency signal components between neighbouring signal on the frequency axis leaking into the image signal. This mixing of different frequency signals is the cause of nonlinear distortion being generated at the wide band analog matrix switch and/or the electrical/optical converting section. This problem becomes more serious with the increase in the number of signals and with the increase in power level of the sound and data signals. In other words, with the prior art frequency-division multiplexing system it is not possible to effectively transmit high quality information. If the power level is increased in order to prevent the different frequency components from being mixed with the image signal, crosstalk from the image signal to the sound signal increases, resulting in a buzzing sound. A frequency band width of 15 kHz is not sufficient to prevent this kind of crosstalk.

SUMMARY OF THE INVENTION

It is therefore an object of the present invention to provide an information transmission system which can keep transmission deterioration at a minimum and can effectively supply high quality information even if many different information signals are transmitted.

It is another object of the present invention to provide an information transmission system in which the information signal effectively selected at the request of a subscriber from the information signals prepared beforehand is distributed and high quality information can be supplied with a minimum of transmission deterioration even when the different selected information signals are amplified, multiplexed and transmitted.

In the information transmitting system of the present invention a desired set of information signals are multiplexed and supplied to each subscriber to provide the information desired by the subscribers. A first multiplexer unit is provided for receiving digital data signals containing multichannel sound signals and generating a time-division multiplexed, or TDM, information signal by time-division multiplexing these digital signals. The TDM information signal is angle-modulated by the modulator unit. A second multiplexer unit is provided for receiving an image signal and the angle-modulated information signal. These signals are frequency-division multiplexed by the second multiplexer unit and an FDM information signal which is adapted to be supplied to a certain subscriber. By using this kind of a hybrid multiplexing technique, the frequency band necessary for supplying an image signal and a multichannel sound signal can be narrowed and the leaking of image signals of different frequency components, which is the cause of nonlinear distortion, can be suppressed or prevented, thereby providing high quality information transmission.

BRIEF DESCRIPTION OF THE DRAWINGS

The present invention is best understood with reference to the accompanying drawings in which:

FIG. 1 is a schematic of the structure of a signal selection circuit of a sub center of an information transmission system of the first embodiment of the present invention, in which the desired information signal is selected in response to a request from a subscriber and converted into an optical signal;

DETAILED DESCRIPTION OF THE PREFERRED EMBODIMENTS

Figure 2:
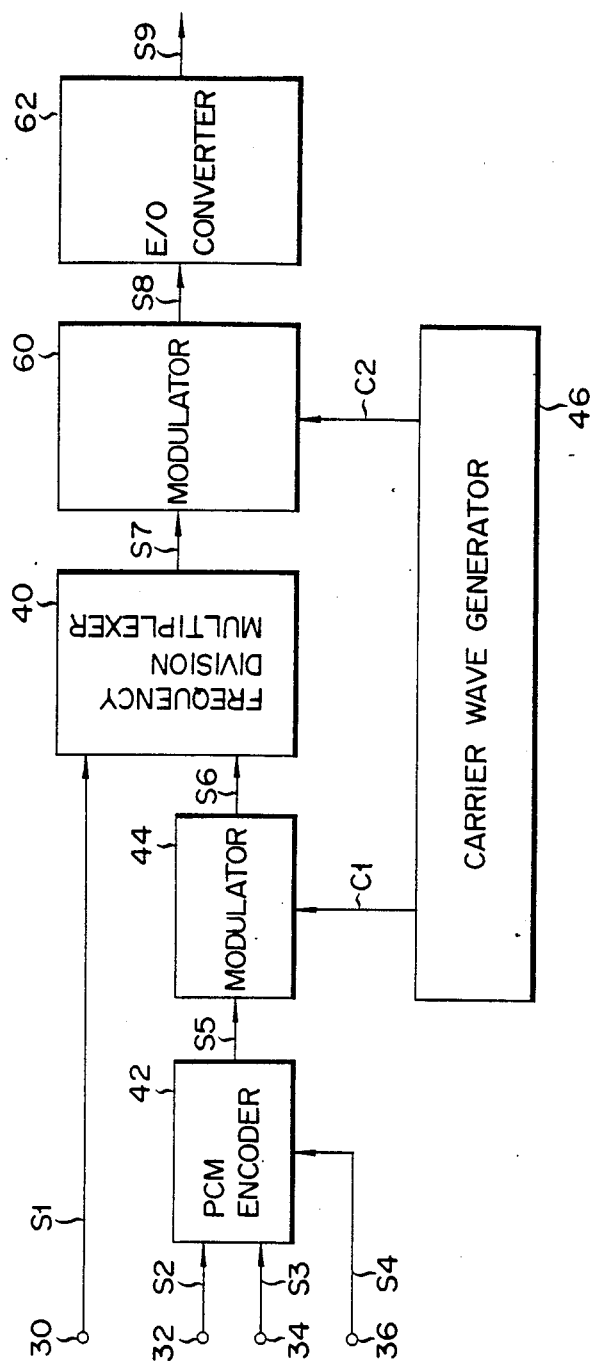
FIG. 2 is a schematic of the whole circuit structure according to the embodiment of FIG. 1 for producing a hybrid multiplexed information signal to be supplied to a subscriber terminal.

With the information transmission system of the embodiment of the present invention shown in FIG. 1, a method of selecting, in response to the request from a plurality of subscribers, the desired information signal from signals which are a prepared predetermined combination of information, is used in the sub center for feeding the signals to a plurality of subscribers. With this system it is possible to service the terminal of each subscriber, or subscriber circuit, with the desired information using optical fiber cable. The prepared information signal may be various combinations of, for example, (1) a color image signal for movies, etc., (2) high fidelity stereo sound signals included in the movie signal. If required, still image data for characters may be supplementarily supplied. A matrix switch is provided in the sub center for carrying out the required signal selection operation.

FIG. 1 shows a simplified circuit structure for selecting an image signal and attached audio signals in response to the request of each subscriber (if necessary digital data signals may be included) and converting the signals into optical signals. Wide-band analog matrix switch 10 has m signal input lines 12 and n signal output lines 14. In matrix switch 10 a transistor, such as a metal oxide semiconductor field effect transistor (MOSFET), is integrated on each intersection of the matrix wires extending in rows and columns. By changing the gate voltage of any one of the MOSFETs, it is possible to make the MOSFET conductive and, thereby, connect the desired input line with a particular output line.

Under the control of control circuit 16, matrix switch 10 is able to transmit the desired information signal to a particular output line 14 in response to a command from a subscriber from m varieties of information signals input to matrix switch 10 from input line 12. In other words, matrix switch 10 can partially change the electrical connection relationships such that a particular input line 12 and particular output line 14 are connected.

Each signal output line 14 from matrix switch 10 is connected to the electrical/optical converter 20 via pulsed FM modulator 18. The information signal to be sent to a particular subscriber selected by matrix switch 10 is converted to an optical signal by converter 20, and supplied to optical fiber cable 22. Accordingly, the selected information signal is transmitted to the subscriber via optical fiber cable 22.

The information signal input and output via matrix switch 10 is multiplexed with a plurality of different signals. In this particular embodiment, each information signal supplied to input line 12 of matrix switch 10, as was described earlier, is a frequency-division multiplex signal formed of (1) a color image signal, (2) a two-channel audio signal attached to the image signal (digital signal), and if necessary, (3) a supplementary character data signal (digital signal). It should be noted that the digital signals, audio and character data signals, are quaternary phase-shift keying signals (QPSK) obtained by time-division multiplexing and quaternary modulating of pulse-coded audio and character data signals. A feature of the QPSK technique is that the spectrum width of the modulated signal can be small. Accordingly, when the audio and character data signals are frequency-divisionally multiplexed with the image signal, it is possible to reduce the frequency band width occupied by the entire multiplexed signal. Namely, in this embodiment each information signal selected by way of matrix switch 10 is a specific signal (referred to as a "hybrid multiplex information signal" hereinafter) which is produced by (1) time-division multiplexing pulse-coded audio and data signals, (2) angle-modulating the digital signals obtained in this way, and (3) frequency-division multiplexing the angle-modulated signal with the image signal.

FIG. 2 shows the overall structure of the circuit for producing the hybrid multiplex information signal of this embodiment. For the sake of convenience, in FIG. 2 matrix switch 10 of FIG. 1 is used to select one hybrid multiplex information signal of one group of information signals selected by one subscriber. This basic concept can simply be expanded to accomodate the number of actual subscribers.

In FIG. 2 analog image signal S1 is supplied to input terminal 30 and 2-channel audio signals S2, S3 (analog) are supplied to input terminals 32, 34, while digital data signal S4 is supplied to input terminal 36. Input terminal 30 is directly connected to frequency-division multiplexer 40 for frequency-division multiplexing. Audio input terminals 32, 34 and data input terminal 36 are connected to frequency-division multiplexer 40 via pulse code modulation (PCM) encoder 42 and modulator 44. Audio signals S2, S3 are PCM-modulated by PCM encoder 42 and converted to digital audio signals. These signals are digitally multiplexed with data signal S4 based on the TDM scheme. In this way, audio signals S2, S3 and data signal S4 are time-divisionally multiplexed by PCM encoder 42 to produce digital signal S5. Signal S5 is supplied to modulator 44 which also receives first carrier wave signal C1 from carrier wave generator 46. This first carrier wave signal C1 has a frequency of, for example, 5 MHz to 15 MHz. Based on digital multiplex signal S5 supplied from encoder 42, first carrier wave signal C1 is angle-modulated so that a primary time-division multiplexed signal S6 of audio signals S2, S3 and data signal S4 is supplied from modulator 44 to frequency division multiplexer 40. The above mentioned quaternary phase-shift keying (QPSK) of the phase-shift keyng (PSK) of the frequency modulation is preferably performed as angle modulation by modulator 44. With this phase-shift keying type of modulation, the spectrum distribution range of the required signal modulation is small and a narrow signal transmission band is possible.

Image signal S1 and multiplex signal S6 are frequency-division multiplexed by multiplexer 40 to produce a secondary multiplexed signal S7. Multiplexer 40 frequency-division multiplexes image signal S1 and multiplex signal S6 so output signal S7 is a frequency-division multiplexed information signal.

Figure 3:
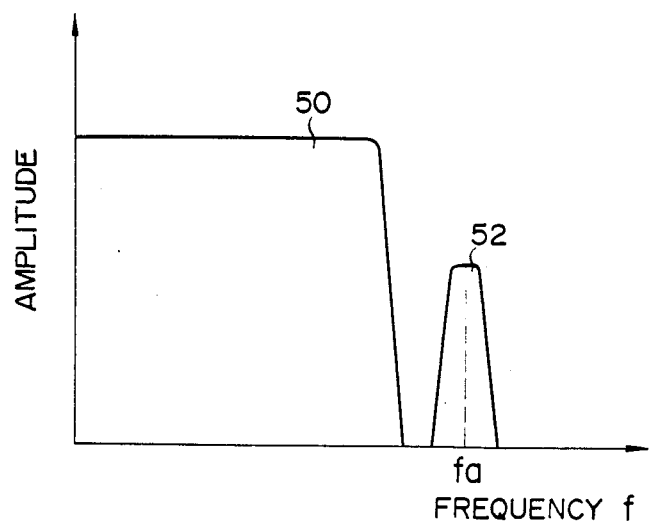
FIG. 3 is a graph showing the frequency spectrum characteristics of the frequency-division multiplexed information signal producted by the circuit structure of FIG. 2.

FIG. 3 is a frequency spectrum characteristic graph of this frequency-division multiplexed information signal S7. In this graph, image signal component 50 is distributed over the baseband while signal component 52, which corresponds to signal S7, is distributed over a higher frequency band. The image signal, the stereo audio signal attached to the image signal, and the data signal are all included in the distribution of these two signal components 50, 50 on the frequency axis.

Figure 4:
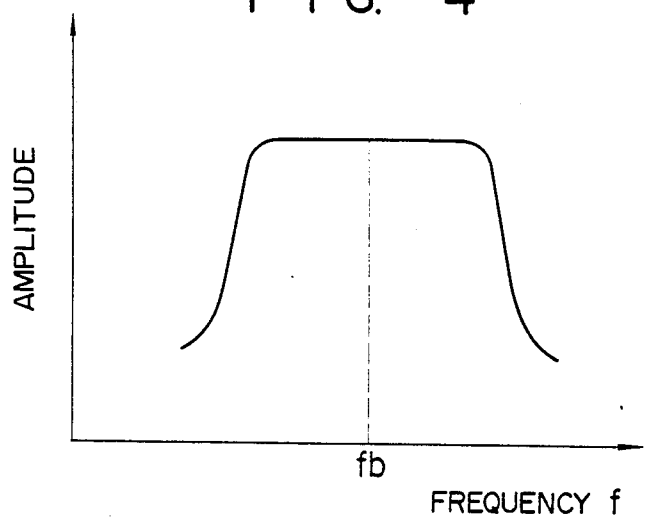
FIG. 4 is a graph showing the frequency spectrum characteristics of the information signal output from the modulator provided before the electrical/optical converter of FIG. 2 and modulated into the final shape for transmission to the subscriber.

Referring back to FIG. 2, output signal S7 from frequency division multiplexer 40 is supplied to second modulator 60, which also receives second carrier wave signal C2 from carrier wave generator 46. Second carrier wave signal C2 has a frequency of, for example, 10 MHz to 100 MHz. Modulator 60 modulates second carrier wave C2 based on signal S7, to thereby send a modulated information signal S8 having the final waveform for transmission to the subscriber to electrical/optical converter 62. The frequency spectrum of modulated signal S8 from modulator 60 is shown in FIG. 4. For modulation of the second carrier wave signal C2 by modulator 60, baseband modulation may be used, but pulse-frequency modulation (PFM) in which the pulse width is kept constant and the pulse generation cycle is varied, or pulsed frequency modulation (pulsed FM) in which the pulse duty cycle is 50%, is preferable. The reason for this is that the linearity of the multiplexed information signal is of paramount importance and in the nonlinear electro/optical conversion processing, the deterioration in the linearity of the multiplexed signal, which is inevitably produced, must be kept to the minimum. If pulse-frequency modulation is performed before the electro/optical conversion, the hybrid multiplexed information signal S8 can maintain good linearity, and, therefore, the signal-to-noise ratio can be improved. Consequently, it is possible to increase the serviceable distance between the subscriber and the sub center.

Modulated signal S8 from modulator 60 is converted to an optical pulse train optical signal S9 by converter 62 for transmission to optical fiber cable 22 (FIG. 1). The hybrid multiplex information signals obtained in this way are sent to the subscribers by way of matrix switch 10 under the control of controller 16 shown in FIG. 1.

With the first embodiment of the invention, which is constructed as described above, the information signals to be supplied to the subscriber are hybrid-multiplexed. Namely, the signals other than the image signal, the audio signals S2, S3 and data signal S4, are digitalized and time-division multiplexed. The resultant digitalized information signal is angle-modulated and then frequency-division multiplexed with image signal S1. Accordingly, in the frequency-division multiplexing process, the signal components corresponding to audio signals S2, S3 and data signal S4 occupy a narrow frequency band approximately equal to that occupied by any one of signals S2, S3, S4 on the frequency axis, as is shown by reference numeral 52 in FIG. 3. Accordingly, not only are the four image, audio and data information signals included in an information signal, the required frequency band width of the hybrid multiplexed information signal of this invention can be reduced by approximately two thirds compared to that of the prior art. Consequently, it is possible to reliably prevent the crosstalk generated between neighbouring signals on the frequency axis (i.e., the mixing of different frequency components with the image signal), which in turn makes it possible to reliably prevent the horizontal synchronous image signal from leaking and mixing with the audio signal because the audio signals are digitalized.

Furthermore, it is possible to prevent the generation of crosstalk and nonlinear distortion in the signal selection process of analog matrix switch 10 which comprises MOSFETs. The reason for this is that by reducing the required frequency band of the hybrid multiplexed information signal, a desired hybrid multiplexed information signal can be selected in such a manner that all the signal components of this information signal are included in the desired frequency band of the MOSFETs of analog matrix switch 10 (no generation of nonlinear distortion). Consequently, it is possible to efficiently supply high quality image information, character data and stereo information having a high S/N ratio and improved dynamic range to the subscriber via optical fiber cable.

According to the hybrid multiplexing technique of this invention, a single digital information signal (time-division multiplexed) formed of the frequency-division multiplexed audio signals S2, S3 and data signal S4 is frequency-division multiplexed with the image signal S1, so only one frequency-division multiplexed carrier wave is required. Also, the level of this carrier wave can be set lower than the carrier wave level used in the prior art analog-type frequency modulation. Accordingly, it is possible to effectively suppress image deterioration due to the beat with the color subcarrier wave signal. Also, the capability of the digital processing circuit is used to the full making it possible to integrate the circuit structure required for the hybrid multiplexing of this invention on wafer chips. This in turn results in a more compact system and contributes greatly to its simplification.

Figure 5:
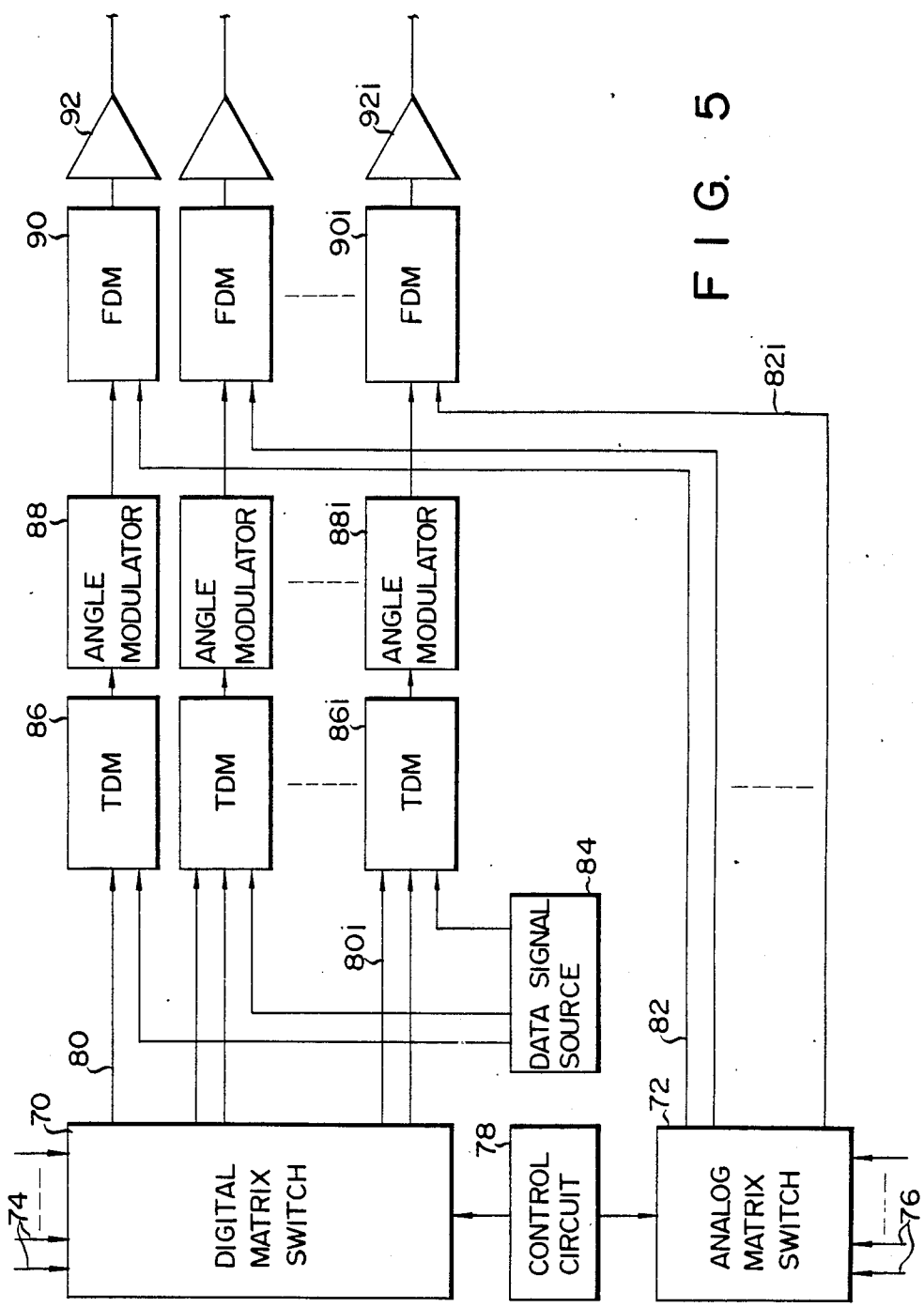
FIG. 5 is a schematic of the structure of a signal selection circuit of a simplified sub center of an information transmission system of the second embodiment of the present invention, in which the desired information signal, which is a combination specified and set in response to a request from the subscriber, is selected and output.

The core concept of this invention, i.e., the special hybrid multiplexing system, is not limited to the above embodiment of using analog matrix switch 10 for selecting the information signal desired by the subscriber. FIG. 5 shows second embodiment of this invention in which each subscriber is able to specify any desired combination of color image information, such as movies, and 2-channel audio information, and, if necessary, character data. For example, the subscriber may at his own discretion select a music program entirely unrelated to the movie he is watching.

FIG. 5 shows the simplified circuit structure required in the sub center for when a combination of different signals is selected in response to a request by the subscriber and converted to an optical signal. The sub center is provided with two kinds of matrix switch units, digital and analog matrix switches 70 and 72. The PCM 2-channel audio signal (digital signal) is supplied to input terminals 74 of switch 70. The analog information signal of the color image signal is supplied to the input terminals 76 of analog matrix switch 72.

Digital and analog matrix switches 70 and 72 are controlled by control circuit 78 which operates in response to a signal select command from the subscriber. When the command is transferred to the controller 78, controller 78 changes the matrix connections inside matrix switch units 70 and 72 in response to the combination of image and audio information desired by the subscriber. Thus, the specified combination of information is output from matrix switch units 70 and 72 to the specified output lines 80 and 82 connected to the subscribers terminal. Namely, in digital matrix switch 70 the matrix line connecting (wiring) pattern is changed such that the desired audio signals are output to the pair of output lines communicating with the subscriber (note: In this embodiment the output line of the matrix corresponding to the 2-channel audio signal is composed of 2 lines). Similarly, with analog matrix switch 72, the matrix line connecting (wiring) pattern is changed such that the desired character data signal is output to a particular output line 82 which communicates with the subscriber.

The plural pairs of output lines 80 of digital matrix switch 70 are connected to time-division multiplexers (TDMs) 86. Data signal generator 84, which generates digital information signals expressing character data, is connected via TDMs 86 and angle modulators 88 to frequency-division multiplexers (FDMs) 90, and the outputs of FDMs 90 are supplied to the corresponding subscribers via the exclusive signal transmission path provided for each subscriber.

The following is a description of the operation that occurs up to the supply of the desired combination of information in response to a request from one subscriber. In FIG. 5 the letter "i" has been affixed to the circuit series related to that one subscriber. For example, TSM 86$i$, angle modulator 88$i$, FDM 90$i$, etc.

The 2-channel digital audio signal, e.g., a stereo audio signal, desired by the subscriber is sent to TDM 86$i$ from the pair of corresponding output lines 80$i$ of digital matrix switch 70 under the control of controller 78. At this time, an independent digital information signal is sent to TDM 86$i$ together with the command signal selected by the subscriber. These signals are time-division multiplexed to produce one TDM signal. This TDM signal is supplied to angle modulator 88$i$ for digital angle modulation. For angle modulation the QPSK technique described in detail for the first embodiment is similarly preferable. The resultant digital modulated signal is then sent to FDM 90$i$.

The desired image signal output from analog matrix switch 72 is supplied to FDM 90$i$ via exclusive output line 82$i$. FDM 90$i$ frequency-division multiplexes the digital angle-modulated signal, which includes the stereo and character data signals, and the image signal to obtain the hybrid multiplexed information signal to be supplied to the subscriber. This signal is supplied to the subscriber via transmission path 92$i$, which also has the function of converting the signal to the format used by the signal transmitting means of that particular system. If the signal transmission means is an optical fiber cable, for example, PFM, in which pulses of a constant width are repeatedly sent and the frequency varies in response to the information or pulsed FM (also called square-waveform FM) is used.

In the second embodiment having the structure described above, a plurality of information for the image, sound and data, etc. can be freely combined at the sub center in response to the demands of individual subscribers of the information transmission system. With this kind of signal selection system, frame information signals sent to the subscriber via signal transmission means, such as an optical fiber cable, are processed using the hybrid multiplexing technique of this invention so it is possible to supply high quality information (pictures, sound, or character messages).

The following is a description of the frame signal synchronization technique, which is particularly important with the above second embodiment. One frame is the signal transmitted corresponding to one subscriber line. With the circuit structure shown in FIG. 5, it is possible to supply any combination of PCM digital audio signal or data signal and the desired image signal. In this case, the combination of digital audio or data signal is time-division multiplexed and supplied to the subscriber. It is essential that these digital signals be in accurate synchronization. The reason for this is that if they are not, the pulses will degrade during signal transmission, the inclusion of false pulses will surpass permissable limits, and correct information will not be transmitted to the subscriber. The circuit structure for framing the digital signals that were time-division multiplexed before being frequency-division multiplexed with the image signal will be described with reference to FIG. 6.

Figure 6:
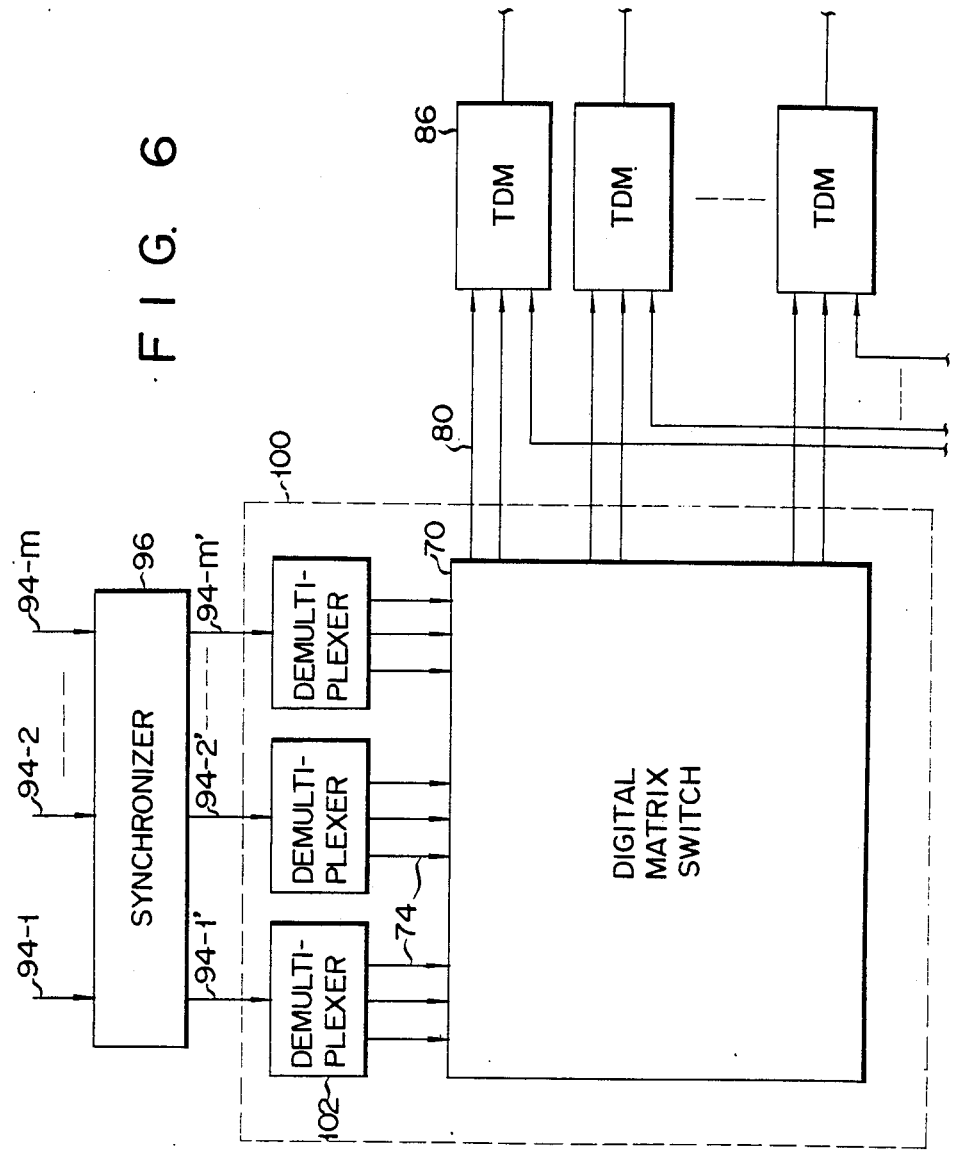
FIG. 6 is a schematic of the signal multiplexing circuit provided in the sub center of the information transmitting system shown in FIG. 5.

In FIG. 6 the same circuit elements as in FIG. 5 have been given the same reference numerals and a description of which has been omitted. A plurality of frames 94-1, 94-2, ..., 94-$m$ are input to synchronizing circuit 96 where they are temporarily stored in the internal buffer memory (not shown) and synchronized. What is desirable at this time is to adjust the frames so that their phases match. For example, when the input frames are transferred from the center to the sub center, if a common clock signal is generated on the center side, it is possible to perform this frame synchronization at the center. However, because frames 94 are time-division multiplexed and sent from the center to the sub center via separate transmission paths, there are differences in the signal propagation delay in the transmission paths so possibility of the phases of the frames being out of synch when received at the sub center is very high. In order to prevent this, synchronizing circuit 96 is provided on the sub center side in this embodiment.

Signal 94' output from synchronizer 96 is supplied to signal selector unit 100. Signal selector unit 100 includes demultiplexers 102-1, 102-2, ..., 102-$m$. Frame signals 94 synchronized by synchronizer 96 are supplied to corresponding demultiplexers 102. Each demultiplexer 102 divides the input frame signal into a plurality of digital information signals 74 (including, for example, multi channel audio signals) as was described in detail with reference to FIG. 5. These information signals 74 are supplied to digital matrix switch 70 as was described earlier. It is preferable that this synchronization of frames be performed at the sub center side so as to facilitate the time-division multiplexing that occurs later at the TDMs.

Figure 7:
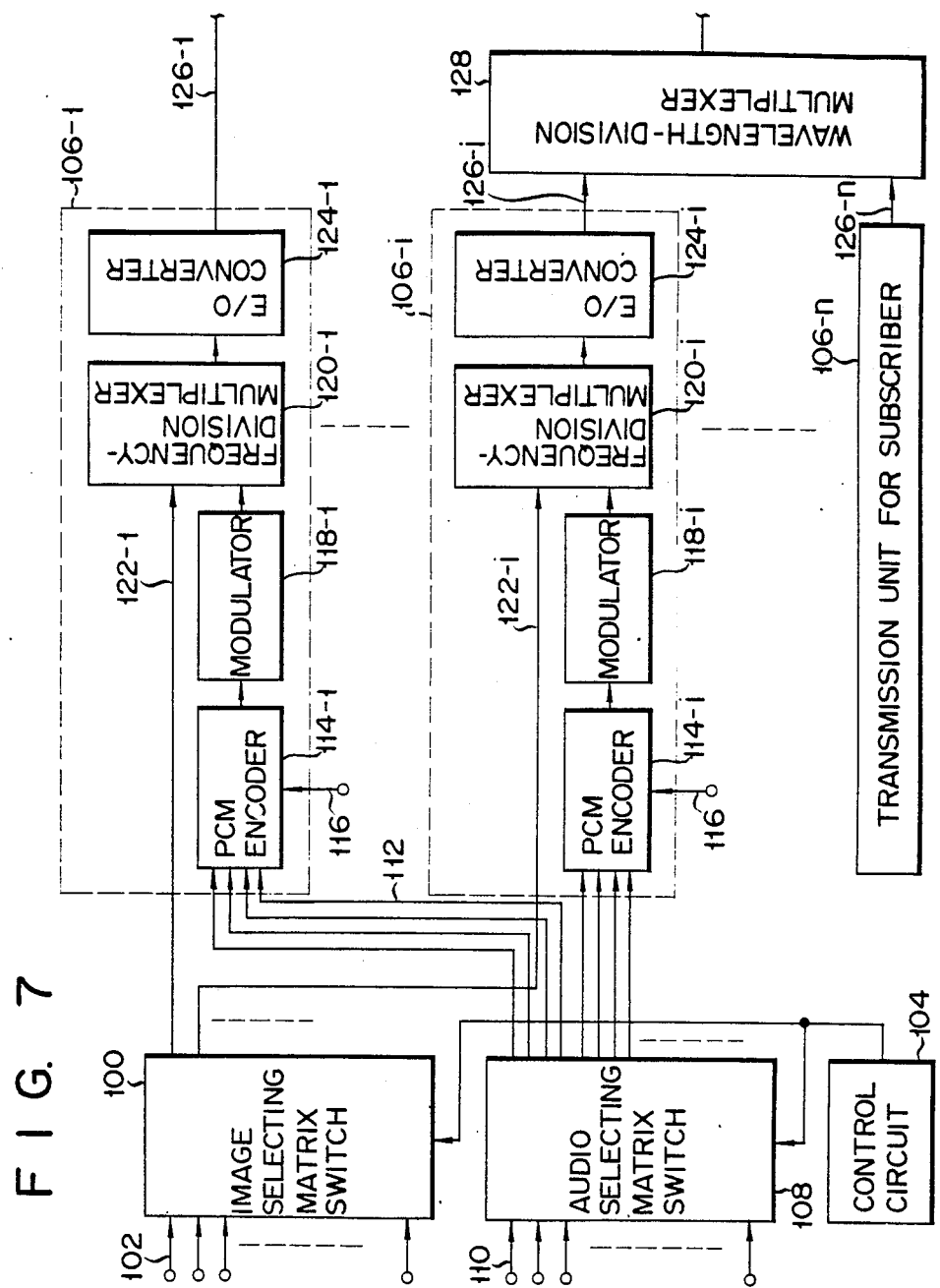
FIG. 7 is a schematic of the structure of a signal selection circuit of a simplified sub center of an information transmission system of the third embodiment of the present invention, in which a special signal selection section is separately provided for the image signal and for the multichannel sound signal.

FIG. 7 shows an information transmission system of the third embodiment of the present invention to which the special hybrid multiplexing, which is the core concept of the present invention, has been applied. With this information transmission system, the image information, 2-channel audio information, and, if necessary, data information are selected by exclusive switches in response to the demands of the subscribers. When the switching operation for signal selection has been completed, the multiple channel audio signal is PCM modulated. This PCM signal is time-division multiplexed with the digital data signal, angle modulated, and then frequency-division multiplexed with the image signal. In this way, even if the subscriber selects any desired audio signals S2, S3, the signal synchronization required for time-division multiplexing can be performed by the PCM encoder exclusively provided for each subscriber so a synchronization circuit at the sub center is unnecessary. Consequently, the structure and control of the signal selecting unit for distributing the desired information signals can be made simple.

In FIG. 7 analog matrix switch 100 receives only image signals 102 and selects, under the control of control circuit 104, the signals desired by the subscribers, each of which is transmited to the corresponding subscriber transmission unit 106-1, ..., 106-i, ..., 106-n. Analog matrix switch 108 receives only audio signals 110, under the control of control circuit 104 selects the desired signals, and respectively transmits them to the corresponding subscriber transmission units 106-1, ..., 106-i, ..., 106-n. In this case, the audio signal is the audio information attached to an image signal or only a music program without an image, etc.

The following is a description of the inner structure of transmission units 106. The structures of these units are the same so only that of unit 106-1 will be described. The same reference numerals have been used for corresponding circuit block and a description has been omitted. The selected multichannel (for example 4) analog audio signal 112 output from selector 108 is supplied to PCM encoder 114-1 provided in transmission unit 106-1. At this time digital data signal 116 is supplied to PCM encoder 114-1 via exclusive data input terminal 118-1. Digital data signal 116 may be a data signal that is common to all the subscribers of the information transmission system, or a data signal with an address, or a data signal selected based on the demands of the subscriber. PCM encoder 114-1 PCM-modulates analog audio signal 112 and time-division multiplexes digital signal 116 with this PCM encoded audio signal. The time-division multiplexed digital information signal output from PCM encoder 114-1 is supplied to modulator 118 and angle modulated.

The signal output from modulator 118-1 is supplied to frequency-division multiplexer 120. At the same time image signal 122-1 also is supplied from image selecting matrix switch 100 to frequency-division multiplexer 120 where input image signal 122-1 and the angle-modulated digital information signal are frequency-division modulated. The FDM information signal, or hybrid multiplexed information signal, from multiplexer 120-1 is transmitted to E/O converter 124-i where it is converted to an optical signal for transmission over optical fiber cable 126-1. Optical fiber cable 126-1 is provided exclusively for the service of one subscriber.

It should be noted that in FIG. 7 the plurality of tranmission units 106-i, ..., 106n are connected to one wavelength division multiplexer 128. Wavelength division multiplexer 128 synthesizes a plurality of optical information signals 126-i, ..., 126-n. This makes it possible to increase the quantity of information provided for one subscriber.

With the above structure, the image and audio signals are selected by exclusive selector units 100, 108 in response to the demands of the subscribers. The signal handled at the selection stage are all analog signals (namely, baseband signals), so there is no particular need to synchronize the audio signals before being transmitted to PCM encoder 114 of transmitter 106. In other words, the signal selection matrix switch units in the sub center can have non synchronous circuit arrangement. Accordingly, the signal processing control can be simplified, the structure can be simplified, and at the same time, it is possible to greatly increase the subscriber information selection range.

Although the present invention has been shown and described with reference to particular embodiments, various changes and modifications which are obvious to a person skilled in the art to which the invention pertains are deemed to lie within the scope of the invention.

According to the above embodiment, in order to modulate the TDM signal in which the audio signal and the digital information signal, such as character data signal, are time-division multiplexed with each other, a quaternary phase shift keying (QPSK) technique was employed. However, the hybrid multiplexing method of this invention is not limited to this and a phase shift keying (PSK) or a frequency-shift keying (FSK) may also be used. With FSK encoding, the frequency region is distributed slightly wider over the spectrum compared with PSK, but there is very little influence from distortion in the transmission path.

With the circuit shown in FIG. 2, a carrier wave signal of 5 MHz to 15 MHz was used as the first carrier wave C1. This frequency setting was determined so as to satisfy the following conditions: (1) the minimum frequency of the first carrier wave C1 is higher than the upper frequency limit of the image signal based on the NTSC system; and (2) the maximum frequency of the carrier wave C1 is set to be in a frequency band which is suitable for improving the S/N ratio. A 10 to 100 MHz carrier wave signal was used as the second carrier wave C2. This frequency setting means that the minimum frequency of the second carrier wave C2 is twice the minimum frequency of the first carrier wave C1 and was set so that the maximum frequency of second carrier wave C2 was in a region such that the S/N ratio was improved.

The information transmission means is not restricted to optical fiber cables and may be radio wave transmission or any of various other ways for transmitting signals.

What is claimed is:

1. A system for supplying subscribers with requested information signals having desired data sets, comprising:
   (a) digital matrix switch means for receiving multichannel digital audio signals and for selecting the desired audio signal, or signals, in response to the demand from a certain subscriber;
   (b) analog matrix switch means for receiving a plurality of analog image signals and for selecting the desired image signal;
   (c) first multiplexer means connected to said digital matrix switch means, for receiving the digital audio signals and a digital data signal, and for time-division multiplexing these digital signals to generate a time-division multiplexed, or TDM, information signal;
   (d) first modulator means connected to said first multiplexer means, for angle-modulating the TDM information signal to generate an angle-modulated information signal;
   (e) second multiplexer means, connected to said first modulator means and said analog matrix switch means, for receiving the selected image signal and the angle-modulated information signal, and for frequency-division multiplexing these signals to generate a frequency-division multiplexed, or FDM, information signal, wherein all the digital information signals but the image signal are distributed in a common frequency band, thereby reducing a frequency band of the FDM information signal;
   (f) second modulator means connected to said second multiplexer means, for receiving a carrier wave signal and the FDM information signal, and for modulating the carrier wave signal based on the FDM information signal to generate an output signal; and (g) electrooptical converter means connected to said second modulator means, for converting the output signal of said second modulator means to an optical signal which is adapted to be supplied to a certain subscriber through said optical signal transmission cable, whereby the frequency band width necessary for optical signal transmission is reduced to suppress the generation of crosstalk between the image signal and digital information signals.

2. The system according to claim 1, further comprising:
data signal generator means for supplying said digital data signal to said first multiplexer means as information common to said subscribers.

3. The system according to claim 2, further comprising:
synchronizer means for synchronizing said digital audio signals to facilitate the time-division multiplexing operation of said first multiplexer means.

4. A system for supplying requested information to subscribers, comprising:
(a) first analog matrix switch means for receiving multichannel analog audio signals and selecting the desired analog sound signal, or signals in response to the demand from a certain subscriber;
(b) second analog matrix switch means for receiving a plurality of analog image signals and selecting the desired image signal in response to the demand from the certain subscriber;
(c) first multiplexer means connected to said first analog matrix switch, for receiving the analog audio signal and a digital data signal, for converting the analog signal to a digital audio signal, and for time-division multiplexing this digital audio signal with said digital data signal to generate a time-division multiplexed, or TDM, information signal;
(d) first modulator means connected to said first multiplexer means, for angle-modulating the TDM information signal to generate an angle-modulated information signal;
(e) second multiplexer means, connected to said first modulator means and said second analog matrix switch means, for receiving the selected image signal and the angle-modulated information signal and for frequency-division multiplexing these signals to generate a frequency-division multiplexed, or FDM, information signal, wherein all the digital information signals but the image signal are distributed in a common frequency band, thereby reducing a frequency band of the FDM information signal;
(f) second modulator means connected to said second multiplexer means, for receiving a carrier wave signal and the FDM information signal, and for modulating the carrier wave signal based on the FDM information signal to generate an output signal; and
(g) electrooptical converter means connected to said second modulator means, for converting the output signal of said second modulator means to an optical signal which is adapted to be supplied to a certain subscriber through said optical signal transmission cable, whereby the frequency band width necessary for optical signal transmission is reduced to suppress the generation of crosstalk between the image signal and the digital information signals.

5. The system according to claim 4, wherein said first multiplexer means comprises:
PCM encoder means for receiving analog multichannel audio signals, pulse encoding the analog audio signals, and time-division multiplexing the PCM audio signals with the digital data signal to generate the TDM information signal.

6. A signal processing apparatus used in an information communication system for supplying subscribers with desired sets of information signals, said apparatus specifying a desired combination of information signals which is transmitted to corresponding subscriber through an optical signal transmission cable, said apparatus comprising:
(a) first multiplexer means for receiving a plurality of items of digital information signals including multichannel audio signals, and for time-division multiplexing the digital information signals to generate a time-division multiplexed, or TDM, information signal;
(b) first modulator means connected to said first multiplexer means, for receiving a first carrier wave and the TDM information signal, and for angle-modulating the first carrier wave signal in accordance with the TDM information signal to generate an angle-modulated information signal; and
(c) second multiplexer means connected to said modulator means, for receiving an image signal and the angle-modulated information signal, and for frequency-division multiplexing these signals to generate a frequency-division multiplexed, or FDM, information signal wherein all the digital information signals but the image signal are distributed in a common frequency band, thereby reducing a frequency band of the FDM information signal;
(d) second modulator means connected to said second multiplexer means, for receiving a second carrier wave signal and the FDM information signal, and for modulating the second carrier wave signal in accordance with the FDM information signal to generate an output signal; and
(e) electrooptical converter means connected to said second modulator means, for converting the output signal of said second modulator means to an optical signal which is adapted to be supplied to a certain subscriber through said optical signal transmission cable, whereby the frequency band width necessary for optical signal transmission is reduced to suppress the generation of crosstalk between the image signal and the digital information signals.

7. The signal processing apparatus according to claim 6, wherein said first multiplexer means receives audio signals and a digital data signal, including a digital message signal, as said digital information signals, and wherein said second multiplexer means generates a frequency-division information signal wherein the image signal is distributed in a baseband and the audio signals and the data signal are commonly distributed in a single frequency band, which is higher than the baseband.

8. The signal processing apparatus according to claim 7, wherein said first multiplexer means comprises:
encoder means for receiving analog audio signals to convert the received analog audio signals to digital audio signals, and for time-division multiplexing the digital audio signals with the digital data signal.

9. The signal processing apparatus according to claim 8, wherein said first modulator means comprises:

angle modulator means for angle-modulating the first carrier wave signal based on a modulation system selected from the group consisting of phase-shift keying modulation, quarternary phase-shift keying modulation, and frequency-shift keying modulation.

10. The signal processing apparatus according to claim 8, further comprising:

matrix switch means for receiving a plurality of items of information signals including said TDM information signal, each of which comprises the image signal, the audio signals and the data signal, and for performing a signal selection process in response to demands from subscribers in such a manner that a certain TDM information signal is outputted to a corresponding output line, which is adapted to be connected to a subscriber terminal.

11. The signal processing apparatus according to claim 10, further comprising:

carrier wave generator means connected to said first and second modulator means, for supplying the first and second carrier wave signals having different frequencies.

* * * * *